Patented June 4, 1929.

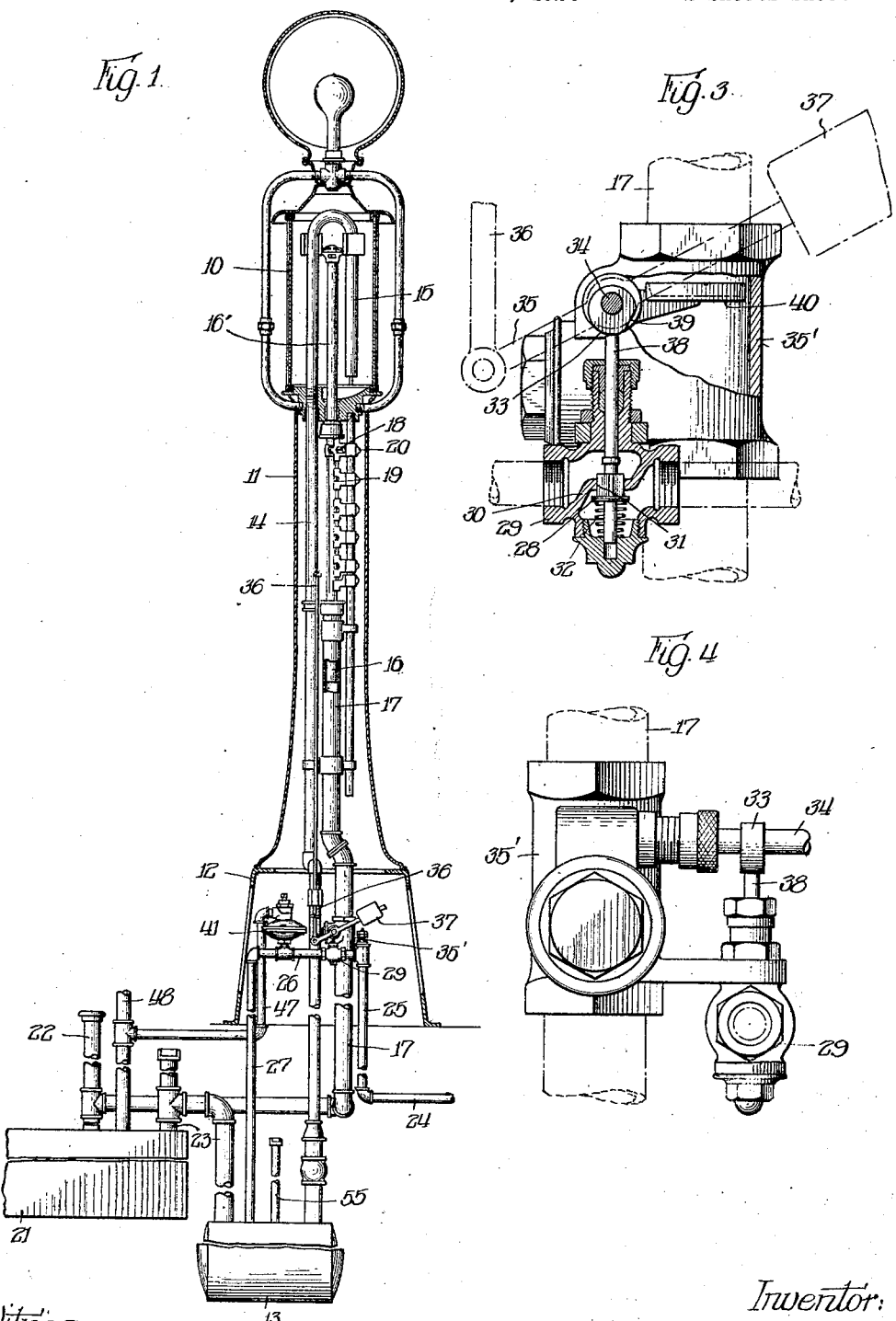

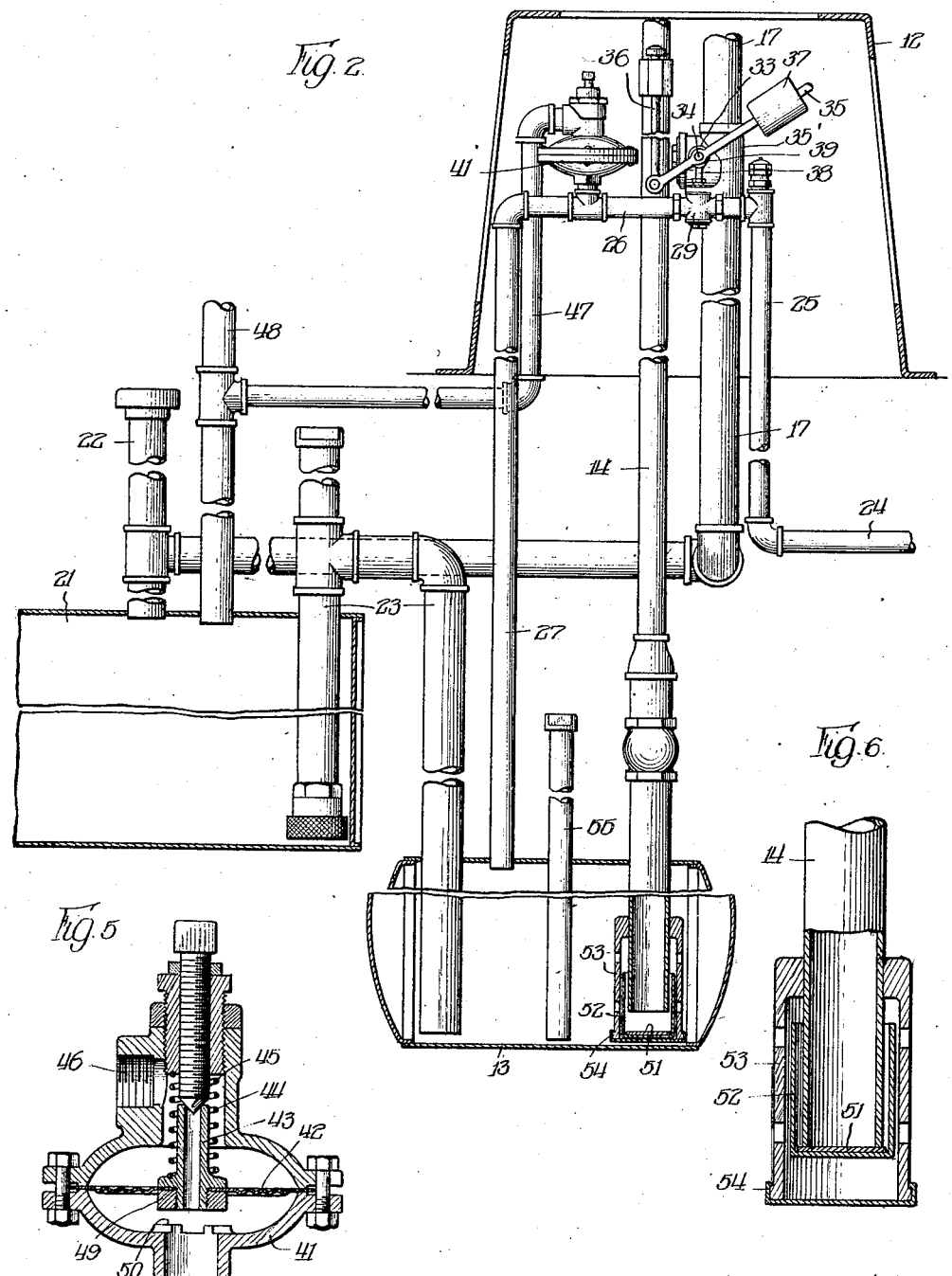

1,715,539

UNITED STATES PATENT OFFICE.

FREDERICK W. DELANOY, OF ROCHESTER, PENNSYLVANIA, ASSIGNOR, BY MESNE ASSIGNMENTS, TO THE WAYNE PUMP COMPANY, OF BALTIMORE, MARYLAND, A CORPORATION OF MARYLAND.

LIQUID-DISPENSING APPARATUS.

Application filed November 8, 1924. Serial No. 748,514.

This invention relates to liquid dispensing apparatus.

One object of the invention is to provide a simple, accurate, reliable and efficient liquid dispensing apparatus in which the various control parts function with precision and in an approved manner.

Another object is to provide liquid dispensing apparatus in which the various parts cooperate in a manner to meet all of the requirements under service conditions.

With these and various other objects in view, the invention consists of certain novel features of construction and operation as will be more fully described and particularly pointed out in the specification, drawings and claims appended hereto.

In the drawings, wherein like reference characters are used to designate like parts—

Figure 1 is a fragmentary front elevation of liquid dispensing apparatus embodying my invention, some of the parts being shown in section for the sake of clearness;

Figure 2 is an enlarged fragmentary front elevation of the control parts and connections as shown in the lower part of Figure 1;

Figure 3 is a fragmentary sectional view, some parts being in elevation, of the air supply control valve and its associated control mechanism;

Figure 4 is an elevation of the parts shown in Figure 3 and at right angles with respect thereto;

Figure 5 is a vertical sectional view of the exhaust valve forming a part of the air control system; and Figure 6 is an enlarged vertical sectional view of a float type of choke valve which is adapted to prevent the flow of air from the liquid supply tank to the measuring tank.

The various novel features of the invention will be apparent from the following description and drawings and will be particularly pointed out in the appended claims.

Referring to the figures of the drawings, it will be noted that I have disclosed my invention in connection with visible measuring apparatus including a glass cylinder 10 forming the measuring tank. This measuring tank is mounted upon a pedestal 11 having a base 12. The liquid to be dispensed is forced into the measuring tank from an auxiliary or supply tank 13, through a pipe line 14, which passes through the pedestal 11 and terminates in a U-shaped or reverse portion 15 for discharging the liquid to be measured into the lower portion of the measuring tank 10. The quantity to be measured is controlled by an overflow conduit 16, the position of which may be adjusted by raising or lowering the same for such purposes. Said overflow conduit 16 telescopes into an associate overflow pipe 17 and has a laterally movable handle 18 secured thereto and selectively receivable in the notch 19 of any one of a number of suitably supported locking members 20 for holding the overflow conduit 16 in adjusted position.

The liquid to be dispensed, such, for example, as gasoline, is first poured into a storage tank 21 through any suitable fill pipe 22. As indicated above, the liquid is not forced direct from the storage tank 21 into the measuring tank 10, but, on the other hand, is first supplied to the auxiliary or supply tank 13, the top of which, it will be noted, is below the lowest level of the storage tank 21. The liquid is siphoned from the storage tank 21 into the auxiliary or supply tank 13 in the usual well known manner through the siphon tube connection 23.

The liquid is forced from the supply tank 13 to the measuring tank 10 by compressed air, which may be supplied from any suitable source represented by the reference character 24. The compressed air is supplied from the source 24 to liquid supply tank 13 through a pipe line including pipes 25, 26 and 27, the latter of which enters the top of the liquid supply tank 13.

Located in the air supply pipe line and more particularly in pipe 26 is a supply control valve 28, best shown in Figure 3. Said valve is mounted in a casing 29 having an apertured partition 30, the aperture or valve opening 31 being opened or closed in accordance with operating conditions. A spring 32 tends to hold the valve 28 in closed position, but said valve also may be held in open position by the high portion of a cam 33 fixed to a shaft 34, supported in a casing 35', forming a chamber in or a portion of the overflow pipe 17. Also secured to the shaft 34 is a lever 35 to one end of which a hand operated rod 36 is pivotally connected. The opposite end of lever 35 is provided with a counterweight 37 which just counterbalances the weight of the rod 36. As shown in Figure 3, the hand operating rod 36 has been depressed, causing the cam 33 to have been rotated into a position in which the valve stem 38 and its control valve 28 have been depressed for opening the latter to permit a flow of compressed air from the compressed air source 24 through the pipes 25, 26 and 27 to the top of supply tank 13. The air supply control valve 28 will remain in an opened position until some force is applied to the shaft 34 for rotating the cam 33 in a clockwise direction, as viewed in Figure 3, for presenting its flat depressed face 39 to the top of the stem 38 for permitting the spring 32 to close the valve 28. In connection with controlling the closing of air supply valve 28, there is secured to the same shaft 34 what might be termed a spoon member 40 which is located within the casing 35′ and more particularly is located in the path of movement of overflow liquid from the measuring tank 10, which liquid overflows down through conduits 16 and 17 as shown in Figure 3. The spoon member 40 is mounted in a horizontal position and in a position to receive the impact of the falling overflow liquid. Such impact is sufficient to rotate the shaft 34 and cam 33 to permit the closing of the valve 28 as hereinabove mentioned. The spoon or valve member 40 does not and is not intended to block the flow of overflow liquid but freely permits the flow of such liquid on all sides thereof. The impact of the overflow liquid, as mentioned above, is sufficient to operate the cam 33 to permit the spring 32 to close the air supply control valve 28.

Also mounted in the air supply pipe line and more particularly connected to the pipe 26 thereof is an exhaust valve for venting the liquid supply tank 13 after the air supply control valve 28 has been closed. This exhaust valve includes a two-part casing 41 in which a diaphragm 42 is clamped. Secured to the central part of the diaphragm is a hollow exhaust valve member 43 against which a spring 44 presses, tending to hold the adjustable valve member 43 away from its stationary cooperating valve member 45 for permitting the passage of air thru the hollow valve member 43 and out through exhaust opening 46 and exhaust line 47, which connects to the vent line 48 leading upwardly from the liquid storage tank 21. When the spring 44 is effective for holding the valve 43 in open position, the nut 49 secured to the hollow end thereof rests upon a suitable seat 50 in the bottom of the valve casing 41. As shown in Figure 5, the exhaust valve is in closed or substantially closed position against the tension of spring 44 and is forced into said position almost immediately after the air supply control valve 28 is opened, and is held in that position until shortly after said air supply control valve 28 has again closed and until the pressure of the air in the liquid supply tank 13 has been dissipated to the extent that the spring 44 overcomes the reduced air pressure, whereupon the remaining air under reduced pressure may escape from the liquid supply tank 13 up thru pipe 27 and thru the exhaust valve as hereinabove mentioned for venting the liquid supply tank 13. It will be understood that when the air supply control valve 28 is moved into open position there is a rush of compressed air through the air supply line, including pipe 26, and this rush of air acting upon the relatively large undersurface of the diaphragm 42 causes an almost immediate closure of the exhaust valve before very much compressed air can escape through the exhaust valve.

As mentioned above, liquid is forced by compressed air from the liquid supply tank 13 up through the pipe line 14 to the measuring tank 10. It will be appreciated that the liquid in supply tank 13 may get sufficiently low to permit the escape of air from the liquid supply tank 13 through the pipe line 14 to the liquid measuring tank 10 unless some means is provided to prevent same. Such preventive means takes the form of a disc choke valve 51 mounted or secured in the bottom of a float cup 52, confined within an apertured casing 53, secured to the lower end of the liquid supply pipe 14, a cap 54 being provided for the lower end of the apertured casing 53 to limit the downward movement of the float cup 52 and its choke valve 51. The choke valve being mounted at the lower end of the liquid supply pipe 14 is located within the liquid supply tank 13. As shown in Figure 2, the choke valve is open to permit the flow of liquid from the supply tank 13 to the measuring tank 10, and as shown in Figure 6, the choke valve is closed to prevent the passage of air from the liquid supply tank 13 to the measuring tank 10, it being understood that when the choke valve 51 is closed the liquid in the liquid supply tank 13 has lowered to a certain predetermined level, at which level there would be air communication between the tank 13 and pipe 14. In connection with the operation of the float choke valve, assuming that the choke valve 51 is in closed position as shown in Figure 6, as a result of the liquid in tank 13 being below a certain predetermined level, liquid will be supplied through the siphon 23 to the tank 13. When the liquid in the tank 13 rises above the upper edge of the cup 52, it overflows into the cup, filling it, thereby causing the metal cup to sink. Disc 51, either secured to the bottom of the cup, or being loose with respect thereto, sinks with the cup, leaving the pipe 14 open for the flow of liquid upwardly therethru when compressed air is supplied to the top of the liquid within supply tank 13. The cup 52 with its valve 51 remains in its sunken position as shown in Figure 2 until the liquid in the tank 13 reaches a given low level, at which level the cup begins to empty to a low level, causing the cup to float and finally rise into the position shown in Figure 6, in which position the valve is closed to prevent the passage of any liquid or the blowing of any air upwardly thru the pipe 14. It will be understood that when the air pressure in the tank 13 is relieved, the latter is filled thru the siphon 23 for again moving the choke valve 51 into an open position. A blow-off pipe 55, which extends thru the top of the liquid supply tank 13 and down to a point adjacent to the bottom thereof is provided for forcing out water when such becomes necessary.

In connection with the operation of the whole device and assuming that liquid has been siphoned from the storage tank 21 into the supply tank 13 and that the overflow pipe 16 has been positioned to measure the desired quantity of liquid to be dispensed, the air supply control valve 28 is opened against the tension of spring 32 by depressing the hand operated rod 36, which rotates the cam 33 into a position for holding the valve 28 open and causes the spoon valve member 40 to assume a horizontal position as shown in Figure 3. A rush of compressed air passes thru the air supply pipes 25, 26 and 27 to the top of the liquid supply tank 13 for forcing liquid from said liquid supply tank 13 thru the pipe 14 into the liquid measuring tank 10 until and shortly after the liquid starts to overflow thru the overflow pipe 16. It will be understood, as explained hereinabove, that upon the first rush of compressed air thru the air line the exhaust valve is moved into a substantially closed position as shown in Figure 5 to prevent any material escape of compressed air therethrough. As soon as the liquid overflows from the measuring tank 10, it falls down into engagement with the spoon member 40 and the impact causes shaft 34 and cam 33 to rotate in a clockwise direction to permit spring 32 to close the air supply control valve 28, whereupon after a certain amount of expansion of the compressed air in the liquid supply tank 13, causing a slight additional supply of liquid to the measuring tank 10, the air pressure in the liquid supply tank falls to the extent that the spring 44 opens the exhaust valve for venting the liquid supply tank 13 as hereinabove described.

By means of this combination, a simple, efficient, reliable and durable liquid dispensing apparatus is provided which is adapted to meet the various requirements under service conditions.

I claim:

1. In liquid dispensing apparatus, the combination of a measuring tank, a liquid supply tank at a lower level connected thereto for supplying liquid to said measuring tank, a source of compressed air, a pipe line connecting said compressed air source and said liquid supply tank for forcing liquid from said liquid supply tank to said measuring tank, an air supply control valve in said pipe line for controlling the flow of compressed air to said liquid supply tank, and a separate exhaust valve in the same pipe line for venting said liquid supply tank, said exhaust valve being arranged to be automatically closed by the rush of air when said air supply control valve is opened.

2. In liquid dispensing apparatus, the combination of a measuring tank, a liquid supply tank at a lower level connected thereto for supplying liquid to said measuring tank, a source of compressed air, a pipe line connecting said compressed air source and said liquid supply tank for forcing liquid from said liquid supply tank to said measuring tank, an air supply control valve in said pipe line for controlling the flow of compressed air to said liquid supply tank, a separate exhaust valve in the same pipe line for venting said liquid supply tank, said exhaust valve being arranged to be automatically closed by the rush of air when said air supply control valve is opened, and means whereby said exhaust valve is automatically opened to vent said supply tank when said air supply control valve is closed and the air pressure within said supply tank is reduced to a predetermined amount.

3. In liquid dispensing apparatus, the combination of a measuring tank, a liquid supply tank at a lower level connected thereto for supplying liquid to said measuring tank, a source of compressed air, a pipe line connecting said compressed air source and said liquid supply tank for forcing liquid from said liquid supply tank to said measuring tank, an air supply control valve in said pipe line for controlling the flow of compressed air to said liquid supply tank, a separate exhaust valve in the same pipe line for venting said liquid supply tank, said exhaust valve being arranged to be automatically closed by the rush of air when said air supply control valve is opened, means whereby said exhaust valve is automatically opened to vent said supply tank when said air supply control valve is closed and the air pressure within said supply tank is reduced to a given amount, and means for automatically controlling the closing of said air supply control valve.

4. In liquid dispensing apparatus, the combination of a measuring tank, a liquid supply tank at a lower level connected thereto for supplying liquid to said measuring tank, a source of compressed air, a pipe line connecting said compressed air source and said liquid supply tank for forcing liquid from said liquid supply tank to said measuring tank, an air supply control valve in said pipe line for controlling the flow of compressed air to said liquid supply tank, a separate exhaust valve in the same pipe line for venting said liquid supply tank, said exhaust valve being arranged to be automatically closed by the rush of air when said air supply control valve is opened, means whereby said exhaust valve is automatically opened to vent said supply tank when said air supply control valve is closed and a given pressure within said supply tank exists, and means whereby said air supply control valve is closed as a result of overflow from said measuring tank.

5. In liquid dispensing apparatus, the combination of a measuring tank, a liquid supply tank at a lower level connected thereto for supplying liquid to said measuring tank, a source of compressed air, a pipe line connecting said source and said liquid supply tank whereby the liquid is forced from said liquid supply tank to said measuring tank, an air supply control valve in said pipe line for controlling the flow of compressed air to said liquid supply tank, an overflow pipe extending from said measuring tank, and means in said overflow pipe responsive to impact from said overflow liquid for controlling said air supply control valve, and means in said pipe line for permitting reduction of pressure in said supply tank after said last named means has been operated.

6. In liquid dispensing apparatus, the combination of a measuring tank, a liquid supply tank at a lower level connected thereto for supplying liquid to said measuring tank, a source of compressed air, a pipe line connecting said source and said liquid supply tank whereby the liquid is forced from said liquid supply tank to said measuring tank, an air supply control valve in said pipe line for controlling the flow of compressed air to said liquid supply tank, and means whereby impact from overflow liquid from said measuring tank controls a movement of said air supply control valve, and means in said pipe line for permitting reduction of pressure in said supply tank after said last named means has been operated.

7. In liquid dispensing apparatus, the combination of a measuring tank, a liquid supply tank at a lower level connected thereto for supplying liquid to said measuring tank, a source of compressed air, a pipe line connecting said source and said liquid supply tank whereby the liquid is forced from said liquid supply tank to said measuring tank, an air supply control valve in said pipe line for controlling the flow of compressed air to said liquid supply tank, and means whereby impact from overflow liquid from said measuring tank permits closing of said air supply control valve, and means in said pipe line for permitting reduction of pressure in said supply tank after said last named means has been operated.

8. In liquid dispensing apparatus, the combination of a measuring tank, a liquid supply tank at a lower level connected thereto for supplying liquid to said measuring tank, a source of compressed air, a pipe line connecting said source and said liquid supply tank whereby the liquid is forced from said liquid supply tank to said measuring tank, an air supply control valve in said pipe line for controlling the flow of compressed air to said liquid supply tank, means whereby impact from overflow liquid from said measuring tank permits closing of said air supply control valve, and an exhaust valve in said pipe line which is arranged to be automatically opened as a result of reduced pressure in said liquid supply tank after said air supply control valve closes for venting said liquid supply tank.

9. In liquid dispensing apparatus, the combination of a measuring tank, a liquid supply tank at a lower level connected thereto for supplying liquid to said measuring tank, a source of compressed air, a pipe line connecting said source and said liquid supply tank whereby liquid may be forced from said liquid supply tank to said measuring tank, an air supply control valve in said pipe line for controlling the flow of compressed air to said liquid supply tank, an exhaust valve in said same pipe line for venting said supply tank, a spring tending to close said air supply control valve, a cam by means of which said air supply control valve may be held open, and means responsive to impact from overflow liquid from said measuring tank for actuating said cam for liberating said air supply control valve to permit its spring to close said valve.

Signed at Rochester, Pennsylvania, this 1st day of November, 1924.

FREDERICK W. DELANOY.